(12) United States Patent
Xu

(10) Patent No.: US 12,490,857 B2
(45) Date of Patent: Dec. 9, 2025

(54) BARBECUE CYLINDER

(71) Applicant: Kang Xu, Guangdong (CN)

(72) Inventor: Kang Xu, Guangdong (CN)

( * ) Notice: Subject to any disclaimer, the term of this patent is extended or adjusted under 35 U.S.C. 154(b) by 0 days.

(21) Appl. No.: 18/789,989

(22) Filed: Jul. 31, 2024

(65) Prior Publication Data

US 2025/0098897 A1 Mar. 27, 2025

(30) Foreign Application Priority Data

Sep. 27, 2023 (CN) .......................... 202322666758.6

(51) Int. Cl.
*A47J 37/04* (2006.01)
*A47J 37/07* (2006.01)

(52) U.S. Cl.
CPC .......... *A47J 37/04* (2013.01); *A47J 37/0786* (2013.01)

(58) Field of Classification Search
CPC .............................. A47J 37/04; A47J 37/0786
See application file for complete search history.

(56) References Cited

U.S. PATENT DOCUMENTS

| | | | | |
|---|---|---|---|---|
| 1,334,876 A * | 3/1920 | Seymour | ................ | A47J 37/047 68/19 |
| 2,041,318 A * | 5/1936 | Berger | .................. | A47J 37/047 34/88 |
| 3,635,146 A * | 1/1972 | Aubert | ................ | A47J 37/0864 219/457.1 |
| 6,038,965 A * | 3/2000 | Thorndyke | ......... | A47J 37/0786 99/449 |
| 6,079,319 A * | 6/2000 | Doria | .................... | A47J 37/047 99/450 |
| 6,708,603 B1 * | 3/2004 | Li-Chen | .............. | A47J 37/1295 99/330 |
| 8,317,444 B1 * | 11/2012 | Hensley | ................ | F16B 5/0266 52/573.1 |
| 2009/0288564 A1 * | 11/2009 | Ketter, Jr. | ........... | A47J 37/1295 99/408 |
| 2011/0168155 A1 * | 7/2011 | Gallo | .................. | A47J 37/0713 126/25 AA |
| 2014/0326372 A1 * | 11/2014 | Simon | ................. | A47J 37/0786 150/154 |
| 2020/0107676 A1 * | 4/2020 | Grantham | ............. | A47J 37/079 |
| 2020/0113384 A1 * | 4/2020 | Loesch | ................ | A47J 37/043 |
| 2022/0133088 A1 * | 5/2022 | Lewis | ................. | A47J 37/0763 126/25 R |

* cited by examiner

*Primary Examiner* — Elizabeth M Kerr
*Assistant Examiner* — Keith Brian Assante

(57) ABSTRACT

Provided in the present application is a barbecue cylinder. The barbecue cylinder includes a cylinder, and an end cover and a handle which are connected to the cylinder, where an accommodating cavity is formed at the back of the cylinder and is configured to place food; an opening is formed at one end of the cylinder; the end cover is configured to cover the opening; and at least a part of the end cover is detachably connected to the cylinder, so that the end cover can be opened or closed relative to the cylinder. A user needs to open the end cover to put or take food during barbecue, since the opening is away from a heated main body portion of the cylinder, the temperature at the end cover is relatively low, thereby reducing the risk of scalding the user.

10 Claims, 7 Drawing Sheets

BARBECUE CYLINDER

CROSS REFERENCE TO RELATED APPLICATION

This application claims priority benefit of Chinese patent Application No. 202420865270.8, filed on Apr. 24, 2024, No. 202322666758.6, filed on Sep. 27, 2023, and the entire contents of which are incorporated herein by reference.

TECHNICAL FIELD

The present invention relates to the technical field of food processing, and in particular to a barbecue cylinder.

BACKGROUND

As a food processing method, barbecue has been widely loved by people this year. People like barbecue, not only because food processed by barbecue is unique and delicious, but also because barbecue can provide an atmosphere suitable for many people to get together. Therefore, feelings can be promoted while delicious food is enjoyed.

An existing barbecue cylinder often adopts a solution for barbecue. In this solution, shafts are respectively arranged on the outer sides of the cover bodies on two sides to lean against concave holes at the corresponding positions of the matched barbecue grill. Furthermore, food is taken and put by adopting a solution in which a cage door capable of being rotatably opened and closed is arranged at a cage body between the cover bodies on the two sides.

However, on one hand, since the cage door is located at the heated cage body, when the cage body is heated while being rotated, the cage door will also be heated to a high temperature, thereby causing a user to be scalded easily when taking and putting food during barbecue; and on the other hand, when barbecue is completed, since the barbecue cylinder is heated to a high temperature, the barbecue cylinder is unlikely to be transferred to a required position.

SUMMARY

Based on this, it is necessary to provide a barbecue cylinder to solve at least one of the above problems.

The present application provides a barbecue cylinder, including a cylinder, and an end cover and a handle which are connected to the cylinder, where
  an accommodating cavity is formed inside the cylinder, the accommodating cavity is configured to place food, an opening is formed at one end of the cylinder, the end cover is configured to cover the opening, and at least a part of the end cover is detachably connected to the cylinder, so that the end cover can be opened or closed relative to the cylinder.

Optionally, the handle is connected to the end cover, and the handle is located on one side of the end cover away from the accommodating cavity.

Optionally, the cylinder includes a cylinder body and a bottom cover connected to the cylinder body, the handle is connected to the bottom cover, the cylinder body is of a mesh structure formed by interweaving metal wires, and the opening is formed at one end of the cylinder body away from the bottom cover.

Optionally, the handle is detachably connected to the bottom cover.

Optionally, one end of the handle is provided with a bolt, the bottom cover is provided with a threaded hole, and the bolt is in threaded connection with the threaded hole.

Optionally, one end of the handle is provided with a bolt, the bottom cover is provided with a through hole, the barbecue cylinder further includes a first nut, and the bolt passes through the through hole and is in threaded connection with the first nut, so that the bottom cover is clamped between the bolt and the handle.

Optionally, the barbecue cylinder further includes a second nut in threaded connection with the bolt, where the second nut is located on one side of the bottom cover away from the first nut, and the bottom cover is clamped between the first nut and the second nut.

Optionally, the barbecue cylinder further includes a washer, where the washer surrounds the bolt and is located between the bottom cover and the second nut.

Optionally, the bottom cover is detachably connected to the cylinder body.

Optionally, the cylinder body is of a cylinder structure, and both the end cover and the bottom cover are circular covers.

Optionally, the cylinder body is of a regular hexagonal cylinder structure, and both the end cover and the bottom cover are regular hexagonal covers.

Optionally, the end cover is detachably connected to the cylinder, so that the end cover can be disassembled from the cylinder or mounted on the cylinder.

Optionally, one end of the end cover is connected to the cylinder through a hinged member, so that the other end of the end cover can be opened or closed in a rotating manner relative to the cylinder.

Optionally, the hinged member includes:
  a U-shaped connecting piece, including a rotating shaft portion and two connecting arms, the two connecting arms being located at two ends of the rotating shaft portion, and the two connecting arms being fixed to the cylinder; and
  a connecting ring, sleeved on the rotating shaft portion, the connecting ring being in clearance fit with the rotating shaft portion, and the connecting ring being fixed to the end cover.

Optionally, the end cover is provided with a snap-fit piece, and the snap-fit piece can be in snap-fit with the cylinder; and
  in a case that the end cover is in a closed state, the snap-fit piece is located on an outer side of the cylinder.

Optionally, the barbecue cylinder further includes a reinforcing ring, where the reinforcing ring is connected to the cylinder, and the reinforcing ring is located at one end of the cylinder close to the end cover;
  the snap-fit piece includes a connecting sheet and a protruding structure arranged on the connecting sheet, the connecting sheet being connected to the end cover, and the protruding structure being located on one side of the connecting sheet close to the cylinder; and
  in a case that the end cover is in the closed state, the protruding structure is clamped with an edge of the reinforcing ring.

Optionally, the protruding structure is of a hemispherical structure.

Optionally, the reinforcing ring is a metal ring.

Optionally, a lifting handle is arranged on the end cover.

Optionally, the lifting handle is rotatably connected to the end cover.

According to the above technical solution, the embodiments of the present application at least have the following advantages and positive effects:

according to the barbecue cylinder in the embodiments of the present application, the opening of the cylinder is formed at one end of the cylinder in an axial direction, the end cover covers the opening, a user needs to open the end cover to put or take food during barbecue, and since the opening is away from the heated main body portion of the cylinder, the temperature at the end cover is relatively low, and the risk of scalding the user is reduced. In addition, the handle is arranged at one end of the end cover, so that the barbecue cylinder can be transferred conveniently. Meanwhile, the temperature of the handle is relatively low, so the risk of scalding the user is reduced.

BRIEF DESCRIPTION OF THE DRAWINGS

The drawings are only used for illustrative description, and cannot be understood as a limitation to this patent; and the same reference numerals are used for components with the same structure and the same function. In the drawings.

Figure 1:
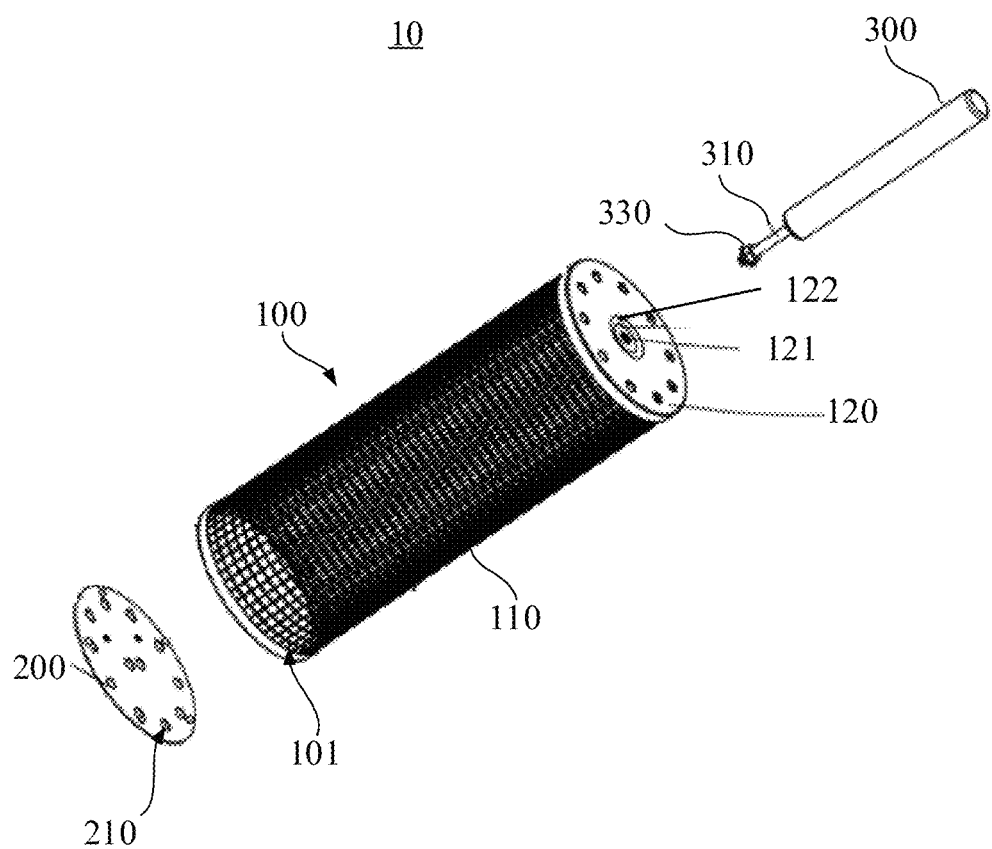
FIG. 1 is a schematic diagram of an overall structure of a barbecue cylinder according to an embodiment of the present application.

DESCRIPTION OF REFERENCE NUMERALS 10. barbecue cylinder;
100. cylinder; 101. accommodating cavity; 110. cylinder body; 120. bottom cover; 121. through hole; 130. reinforcing ring;
200. end cover; 210. air vent;
300. handle; 310. bolt; 320. first nut; 330. second nut; 340. washer;
400. hinged member; 410. U-shaped connecting piece; 411. rotating shaft portion; 412. connecting arm; 420. connecting ring;
500. snap-fit piece; 510. connecting sheet; 520. protruding structure;
600. lifting handle.

DETAILED DESCRIPTION OF THE EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application.

In the description of the present application, it should be understood that an azimuth or position relationship indicated by terms "upper", "lower", "left", "right" and the like is an azimuth or position relationship based on the accompanying drawings, which is only for facilitating the description of the present application and simplifying the description, but not indicates or implies that the referred device or element necessarily have a specific azimuth and perform construction and operation in the specific azimuth; therefore, the terms describing the position relationship in the accompanying drawings are only for exemplary description, but cannot be interpreted as a limitation to the patent. Those of ordinary skill in the art can understand the specific meanings of the above terms according to the specific situations.

In addition, terms "first" and "second" are used merely for description, and cannot be construed as indicating or implying relative importance or implicitly indicating a quantity of indicated technical features. Thus, features defined with "first" and "second" may explicitly or implicitly include one or a plurality of features. In the description of the present application, "a plurality" means at least two, for example, two, three, or the like, unless otherwise specifically defined. "/" represents "or" unless otherwise specified. For example, A/B may indicate A or B; and "and/or" is merely an association relationship that describes associated objects, and indicates that there may be three relationships. For example, A and/or B may represent three cases: only A exists, both A and B exist, and only B exists.

In the description of the present application, unless otherwise clearly specified and limited, the terms "mounting", "connected", "connection", "fixation" and the like are intended to be understood in a broad sense. For example, the "connection" may be a fixed connection, removable connection or integral connection; may be a mechanical connection or electrical connection; may be a direct connection or indirect connection using a medium; and may be a communication or interaction between two elements, unless otherwise explicitly limited. For those of ordinary skill in the art, the specific meaning of the terms in the present application may be understood according to specific situations.

During use of an existing barbecue cylinder, a user is likely to be scalded when taking and putting food; or when barbecue is completed, since the barbecue cylinder is heated to a high temperature, the barbecue cylinder is unlikely to be transferred to a required position.

Based on this, the embodiments of the present application provide a barbecue cylinder, which is intended to solve at least one of the above problems.

Figure 2:
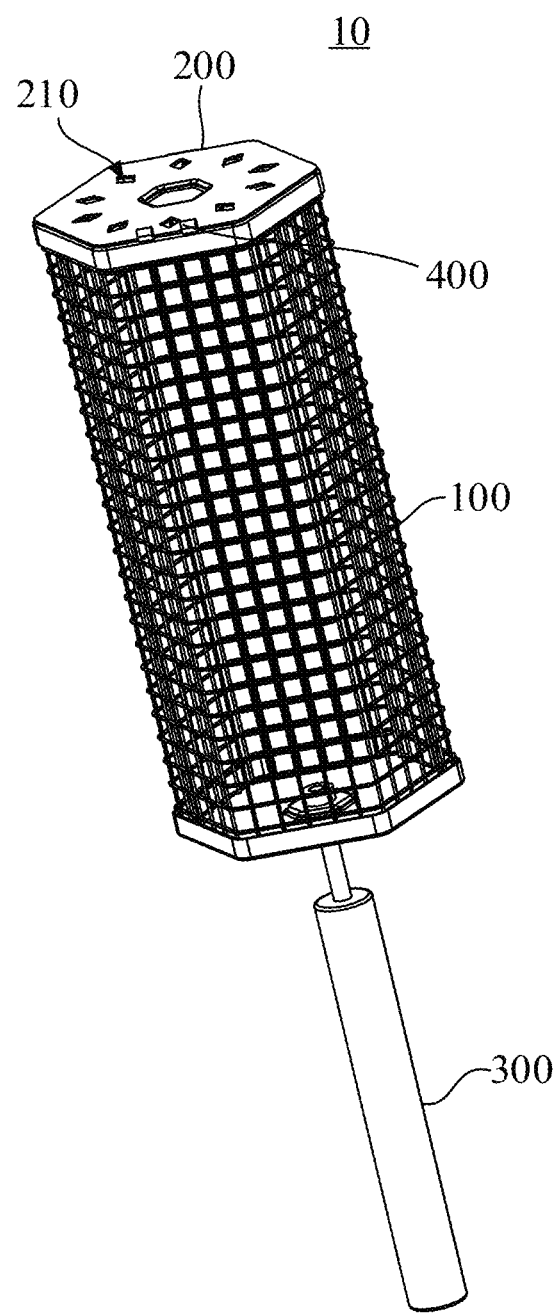
FIG. 2 is a schematic diagram of an overall structure of a barbecue cylinder according to another embodiment of the present application.
Figure 3:
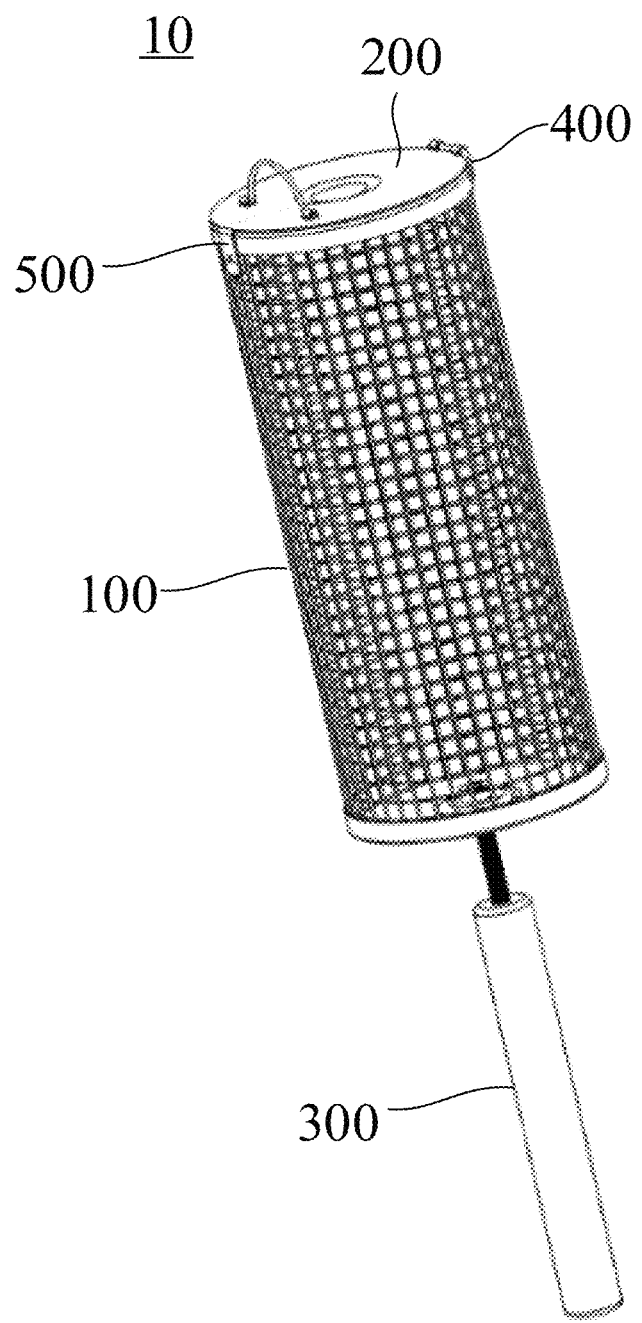
FIG. 3 is a schematic diagram of an overall structure of a barbecue cylinder according to yet another embodiment of the present application.

As shown in FIG. 1, FIG. 2 and FIG. 3, a barbecue cylinder 10 in the embodiments of the present application includes a cylinder 100, an end cover 200 and a handle 300, where the end cover 200 and the handle 300 are connected to the cylinder 100; an accommodating cavity 101 is formed inside the cylinder 100, and the accommodating cavity 101 is configured to place food to be barbecued; an opening is formed at one end of the cylinder 100; the end cover 200 is configured to cover the opening; and at least a part of the end cover 200 is detachably connected to the cylinder 100, so that the end cover 200 can open or close the cylinder 100 first.

According to the barbecue cylinder 10 in the embodiments of the present application, the opening of the cylinder 100 is formed at one end of the cylinder 100 in an axial direction, the end cover 200 covers the opening, and a user needs to open the end cover 200 to put or take food during barbecue. Since the opening is away from a heated main body portion of the cylinder 100, the temperature at the end cover 200 is relatively low, and the risk of scalding the user is reduced.

In addition, the handle 300 is arranged at one end of the end cover 200, so that the barbecue cylinder 10 can be transferred conveniently. Meanwhile, the temperature of the handle 300 is relatively low, so the risk of scalding the user is reduced.

Figure 4:
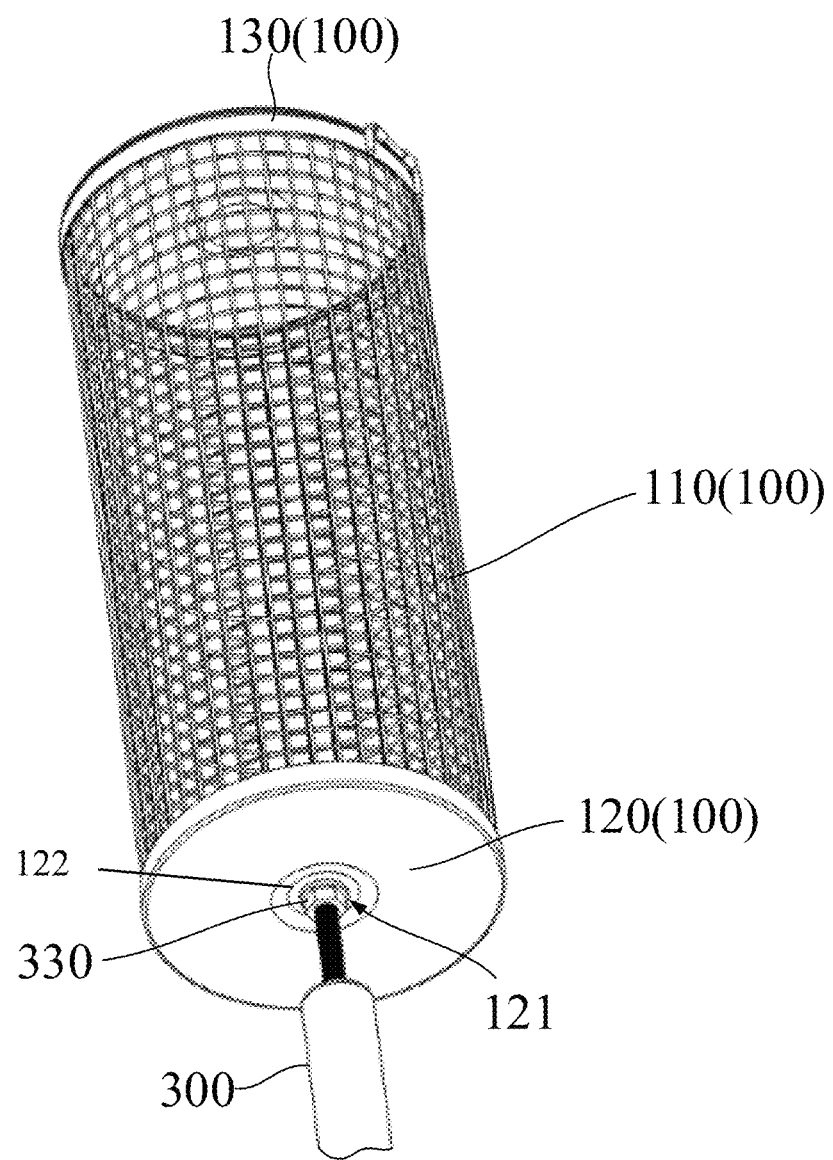
FIG. 4 is a view of a barbecue cylinder shown in FIG. 3 in another perspective.
Figure 5:
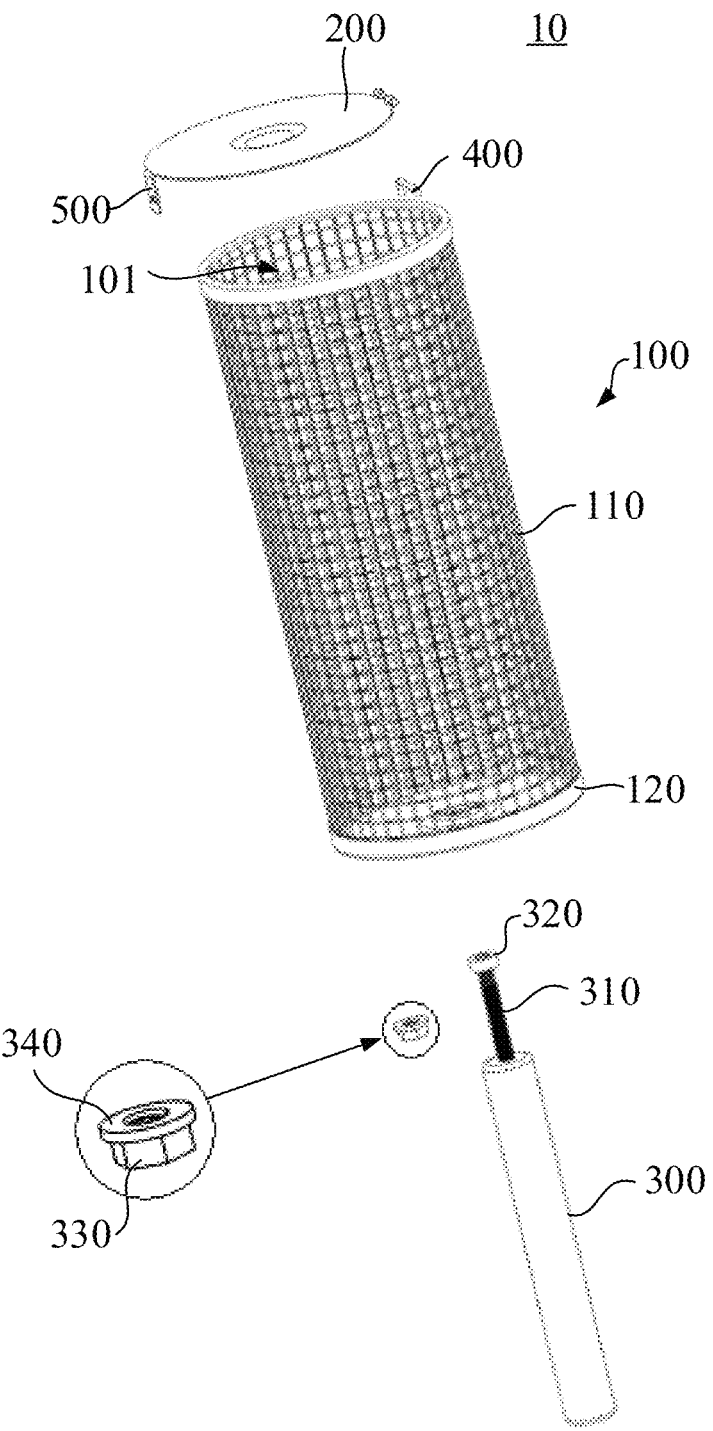
FIG. 5 is a schematic diagram of an exploded structure of a barbecue cylinder shown in FIG. 3.

In some of the embodiments, as shown in FIG. 4 and FIG. 5, the cylinder 100 includes a cylinder body 110 and a bottom cover 120 connected to the cylinder body 110, the handle 300 is connected to the bottom cover 120, and the opening is formed at one end of the cylinder body 110 away from the bottom cover 120.

It may be understood that in some other embodiments, the handle 300 may not be connected to the bottom cover 120, but is directly connected to the end cover 200. Specifically, a manufacturer may set the handle 300 to be detachably connected to the end cover 200 or not according to requirements.

Specifically, the cylinder body 110 is of a mesh structure formed by interweaving metal wires, and may be a copper wire, an iron wire or an aluminum wire. Relative to a high melting point, molten deformation during barbecue can be avoided. Of course, the cylinder body 110 may also be made of other materials with a high melting point.

The cylinder body 110 adopts the mesh structure, so that high-temperature air can completely wrap food, and the food can be heated rapidly and uniformly. The bottom cover 120 is connected to the cylinder body 110. The bottom cover 120 may adopt a metal cover, has the characteristic of resisting high temperature, and also can enhance the structural strength of the cylinder 100.

Specifically, a hand shank of the handle 300 adopts a woody hand shank, and the woody hand shank has a good heat-insulating effect, so that a hand can be prevented from being scalded by high temperature when holding the hand shank. Of course, the handle 300 may also adopt other materials, such as metal.

In some of the embodiments, as shown in FIG. 5, the handle 300 is detachably connected to the bottom cover 120. The detachable handle 300 is convenient to store.

Specifically, referring to FIG. 4 and FIG. 5, in this embodiment, a bolt 310 is arranged at one end of the handle 300, indicating that the bottom cover 120 has a through hole 121 and a recess 122, the through hole 121 is provided at a center of the recess 122; the barbecue cylinder 10 further includes a first nut 320, and the bolt 310 passes through the through hole 121 and is in threaded connection with the first nut 320, so that the bottom cover 120 is clamped between the bolt 310 and the handle 300. In this way, the side of the bottom cover 120 facing the handle 300 is able to be placed on a flat surface on an even keel, and avoid the shaking of the cylinder 100 when the user places the cylinder 100 upright on the flat surface through the bottom cover 120, when the through hole 121 deforms towards the side of the bottom cover 120 facing the handle 300 due to installation and disassembly of the handle 300.

Further, the barbecue cylinder 10 further includes a second nut 330 in threaded connection with the bolt 310, where the second nut 330 is located on one side of the bottom cover 120 away from the first nut 320, and the bottom cover 120 is clamped between the first nut 320 and the second nut 330. The first nut 320 and/or the second nut 330 are/is detachably mounted on the bolt 310 through a threaded connection.

In this way, it is beneficial to replace new parts in time when threads of the first nut 320 and/or the second nut 330 are damaged, so that the service life of the barbecue cylinder 10 can be prolonged.

Further, the barbecue cylinder 10 further includes a washer 340, where the washer 340 surrounds the bolt 310 and is located between the bottom cover 120 and the second nut 330. The washer 340 can enlarge the contact area with the bottom cover 120, so that the handle 300 and the cylinder 100 can be connected more stably, and the shaking of the cylinder 100 when the user holds the handle 300 can be reduced.

Of course, in other embodiments, the barbecue cylinder may not be provided with the first nut 320 and the second nut 330, the through hole 121 is set as a threaded hole, and the handle 300 is detachably connected to the bottom cover 120 through the threaded connection between the bolt 310 and the threaded hole.

It may be understood that the handle 300 may further be connected to the bottom cover 120 through other detachable manners, including but not limited to snap connection, interference fit, key connection, pin connection and elastic connection.

In another embodiment, the bottom cover 120 is detachably connected to the cylinder body 110, thereby facilitating storage and carrying.

In one embodiment, referring to FIG. 3, the cylinder body 110 is of a cylinder structure, and both the end cover 200 and the bottom cover 120 are circular covers. The cylinder body 110 adopts a cylinder structure, so that the accommodating cavity 101 is a cylindrical space, so that it is beneficial to prevent a corner portion difficult to clean from being formed in the cylinder 100. Correspondingly, the end cover 200 and the bottom cover 120 are also circular covers, thereby ensuring that the end cover 200 and the bottom cover 120 can tightly cover the cylinder 100.

In another embodiment, referring to FIG. 2, the cylinder body 110 is of a regular hexagonal cylinder structure, and both the end cover 200 and the bottom cover 120 are regular hexagonal covers. The cylinder body 110 adopts a regular hexagonal cylinder structure, so that the cylinder 100 is more stable and unlikely to roll when being placed on the ground or other supporting surfaces. Correspondingly, the end cover 200 and the bottom cover 120 are also regular hexagonal covers, thereby ensuring that the end cover 200 and the bottom cover 120 can tightly cover the cylinder 100.

It may be understood that in other embodiments, the cylinder body 110 may further be of a regular quadrilateral cylinder structure, a regular pentagonal cylinder structure or the like, and the end cover 200 and the bottom cover 120 are corresponding regular quadrilateral covers, regular pentagonal covers or the like, which are not limited in the present application.

Specifically, referring to FIG. 1 and FIG. 2, the end cover 200 is provided is provided with a plurality of air vents 210, so that the air can enter the accommodating cavity 101 to perform heat dissipation on food. Of course, the bottom cover 120 may also be provided with an air vent 210 according to requirements.

Continuously referring to FIG. 1, in one embodiment, the end cover 200 is detachably connected to the cylinder 100, so that the end cover 200 can be disassembled from the cylinder 100 or mounted on the cylinder 100. That is, when a user puts and takes food, the whole end cover 200 can be disassembled from the cylinder 100, food to be barbecued is put into the cylinder 100 or the barbecued food is taken out of the cylinder 100. Specifically, a protruding block may be arranged on an inner wall of the end cover 200, and a groove is formed in an outer wall of the cylinder 100, so that the end cover 200 and the cylinder 100 can be detachably connected. In addition, connection manners such as snap connection and interference fit may also be used, which is not limited by the present application.

Referring to FIG. 2 to FIG. 8, in another embodiment, the end cover 200 and the cylinder 100 are connected through a hinged member 400, so that the end cover 200 can be opened or closed in a rotating manner relative to the cylinder 100.

Specifically, the hinged member 400 includes a U-shaped connecting piece 410 and a connecting ring 420, where the U-shaped connecting piece 410 includes a rotating shaft portion 411 and two connecting arms 412; the two connecting arms 412 are located at two ends of the rotating shaft portion 411; the two connecting arms 412 are fixed to the cylinder 100; the connecting ring 420 is sleeved on the rotating shaft portion 411; the connecting ring 420 and the rotating shaft portion 411 are in interference fit; and the connecting ring 420 is fixed to the end cover 200. In this way, the end cover 200 and the cylinder 100 may be connected together through the hinged member 400, and the end cover 200 can rotate relative to the cylinder 100.

Further, the end cover 200 is further provided with a snap-fit piece 500, and the snap-fit piece 500 can be in snap-fit with the cylinder 100; and in a case that the end cover 200 is in a closed state, the snap-fit piece 500 is located on an outer side of the cylinder 100.

When the end cover 200 is closed, the snap-fit piece 500 is in snap-fit with the cylinder 100, so that the end cover 200 can be kept closed. Furthermore, in a case that the end cover 200 is in the closed state, the snap-fit piece 500 is located on the outer side of the cylinder 100, so that an operator can visually observe whether the snap-fit piece 500 is clamped with the cylinder 100 in place, and the situation that the end cover 200 is not tightly covered can be avoided.

Figure 6:
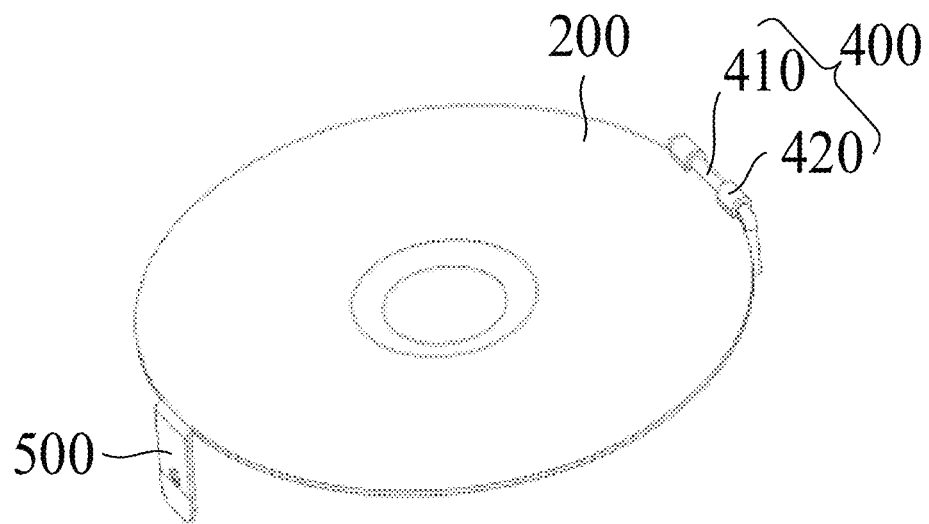
FIG. 6 is a structural schematic diagram of an end cover according to an embodiment of the present application.

In this embodiment, as shown in FIG. 6, one snap-fit piece 500 is provided, and the snap-fit piece 500 and the hinged member 400 are located at two opposite ends of the end cover 200. In this way, the snap-fit piece 500 is farthest from the hinged member 400, that is, the arm of force is maximized, thereby improving the snap-fit stability between the snap-fit piece 500 and the cylinder 100.

In another embodiment, a plurality of snap-fit pieces 500 are provided, and the plurality of snap-fit pieces 500 are arranged at intervals along an edge of the end cover 200. In this way, it is beneficial to improve the connection stability between the end cover 200 and the cylinder 100 when the end cover is in the closed state.

Specifically, FIG. 4 shows that the cylinder 100 further includes a reinforcing ring 130, the reinforcing ring 130 is connected to the cylinder body 110, and the reinforcing ring 130 is located at one end of the cylinder body 110 away from the bottom cover 120. The snap-fit 500 includes a connecting sheet 510 and a protruding structure 520 arranged on the connecting sheet 510, the connecting sheet 510 is connected to the end cover 200, and the protruding structure 520 is located on one side of the connecting sheet 510 close to the cylinder 100. In a case that the end cover 200 is in the closed state, the protruding structure 520 is clamped with an edge of the reinforcing ring 130.

The arrangement of the reinforcing ring 130 can improve the structural strength of the cylinder 100, so that the possibility of deformation of the cylinder body 110 can be reduced. In addition, the snap-fit piece 500 includes a connecting sheet 510 and a protruding structure 520, and the protruding structure 520 can be clamped with the edge of the reinforcing ring 130, so that the snap-fit piece 500 can be in snap-fit with the cylinder 100. Furthermore, the reinforcing ring 130 has better structural strength and structural stiffness compared with the cylinder body 110, and a stable clamping state can be achieved between the protruding structure 520 and the reinforcing ring 130.

Further, the snap-fit piece 500 may be a metal piece, so on one hand, the snap-fit piece can bear a higher temperature, also has better structural strength and structural stiffness, and can stably play a snap-fit role.

Further, the protruding structure 520 is of a hemispherical structure. In this way, in the opening process of the end cover 200, the protruding structure 520 and the reinforcing ring 130 can be separated easily through an external force, and the situation that the end cover 200 is difficult to open can be avoided.

Figure 7:
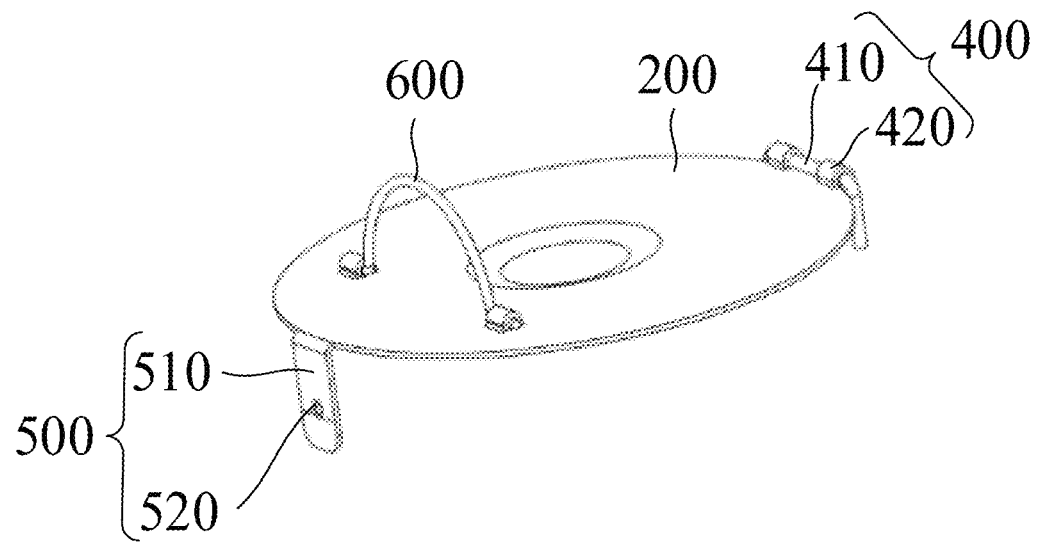
FIG. 7 is a structural schematic diagram of an end cover according to another embodiment of the present application.
Figure 8:
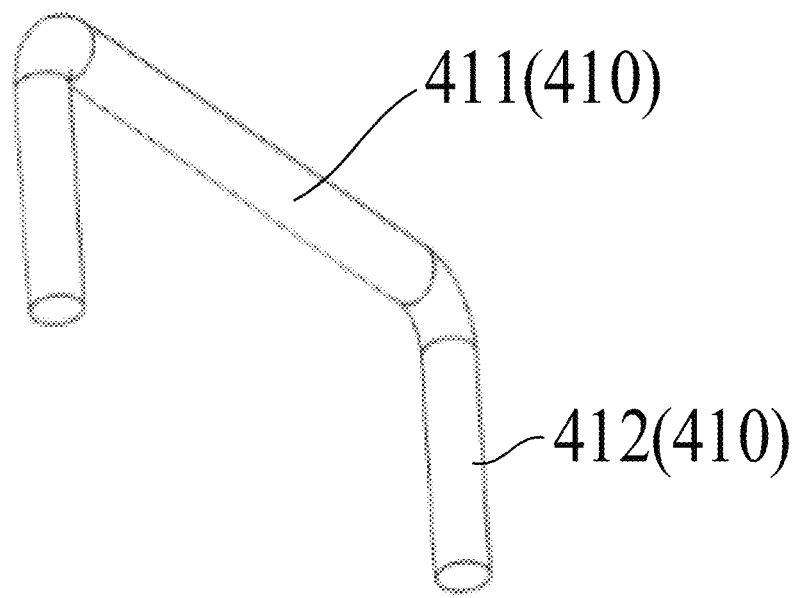
FIG. 8 is a schematic enlarged diagram of a U-shaped connecting piece according to the present application.

In one embodiment, as shown in FIG. 7, a lifting handle 600 is further arranged on the end cover 200. Specifically, the lifting handle 600 is rotatably connected to the end cover 200. In this way, when the barbecue cylinder 10 is picked up, the handle 300 can be held by one hand, and the lifting handle 600 can be held by the other hand, so that the balance of the barbecue cylinder 10 can be better kept in the taking process.

In the description of this embodiment, unless otherwise specified, "a plurality of" means two or more. The foregoing descriptions are merely specific embodiments of the present application, but are not intended to limit the protection scope of the present application. Any variation or replacement within the technical scope disclosed in the present application shall fall within the protection scope of the present application. Therefore, the protection scope of the present application should be subject to the protection scope of the claims.

What is claimed is:

1. A barbecue cylinder, comprising a cylinder, and an end cover and a handle which are connected to the cylinder, wherein an accommodating cavity is formed inside the cylinder, the accommodating cavity is configured to place food, an opening is formed at one end of the cylinder, the end cover is configured to cover the opening, and at least a part of the end cover is detachably connected to the cylinder, so that the end cover is capable of being opened or closed relative to the cylinder;

wherein the cylinder comprises a cylinder body and a bottom cover connected to the cylinder body, the handle is detachably connected to the bottom cover; one end of the handle is provided with a bolt, the bottom cover is provided with a threaded hole, and the bolt is in threaded connection with the threaded hole;

wherein one end of the end cover is connected to the cylinder through a hinged member, so that the other end of the end cover is capable of being opened or closed in a rotating manner relative to the cylinder;

wherein the end cover is provided with a snap-fit piece, and the snap-fit piece is capable of being in snap-fit with the cylinder; and in a case that the end cover is in a closed state, the snap-fit piece is located on an outer side of the cylinder;

wherein barbecue cylinder further comprises a reinforcing ring, wherein the reinforcing ring is connected to the cylinder, and the reinforcing ring is located at one end of the cylinder close to the end cover; the snap-fit piece comprises a connecting sheet and a protruding structure arranged on the connecting sheet, and the protruding structure being located on one side of the connecting sheet close to the cylinder; and in a case that the end cover is in the closed state, the protruding structure is snap-fit with an edge of the reinforcing ring;

wherein the protruding structure is of a hemispherical structure.

2. The barbecue cylinder according to claim 1, wherein the cylinder body is of a mesh structure formed by interweaving metal wires, and the opening is formed at one end of the cylinder body away from the bottom cover.

3. The barbecue cylinder according to claim 2, wherein the bottom cover is detachably connected to the cylinder body.

4. The barbecue cylinder according to claim 2, wherein the cylinder body is of a cylinder structure, and both the end cover and the bottom cover are circular covers.

5. The barbecue cylinder according to claim 2, wherein the cylinder body is of a regular hexagonal cylinder structure, and both the end cover and the bottom cover are regular hexagonal covers.

6. The barbecue cylinder according to claim 1, wherein the end cover is detachably connected to the cylinder, so that the end cover is capable of being disassembled from the cylinder or mounted on the cylinder.

7. The barbecue cylinder according to claim 1, wherein the hinged member comprises:

a U-shaped connecting piece, comprising a rotating shaft portion and two connecting arms, the two connecting arms being located at two ends of the rotating shaft portion, and the two connecting arms being fixed to the cylinder; and a connecting ring, sleeved on the rotating shaft portion, the connecting ring being in clearance fit with the rotating shaft portion, and the connecting ring being fixed to the end cover.

8. The barbecue cylinder according to claim 1, wherein the reinforcing ring is a metal ring.

9. The barbecue cylinder according to claim 1, wherein a lifting handle is arranged on the end cover.

10. The barbecue cylinder according to claim 9, wherein the lifting handle is rotatably connected to the end cover.

\* \* \* \* \*